UNITED STATES PATENT OFFICE.

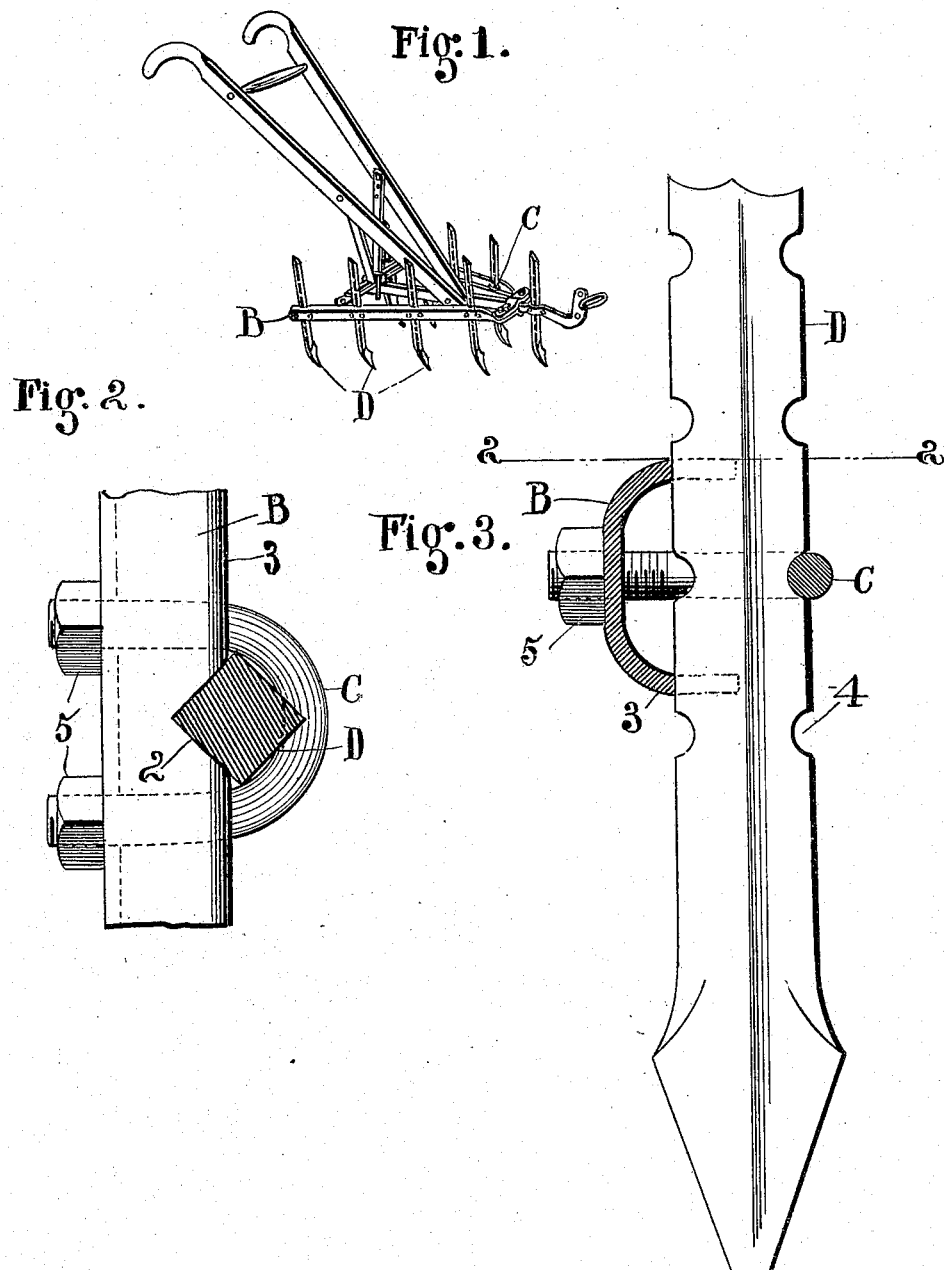

ELIAS HAIMAN, OF CLEVELAND, OHIO.

HARROW.

937,239.    Specification of Letters Patent.    Patented Oct. 19, 1909.

Application filed March 2, 1908. Serial No. 418,640.

*To all whom it may concern:*

Be it known that I, ELIAS HAIMAN, a citizen of the United States, residing at Cleveland, county of Cuyahoga, and State of Ohio, have invented certain new and useful Improvements in Harrows, and do declare that the following is a full, clear, and exact description of the invention, which will enable others skilled in the art to which it appertains to make and use the same.

My invention relates to improvements in harrows, and the invention consists in means for securing harrow teeth adjustably in or upon a metallic frame having edges especially adapted to engage said teeth and clips or stirrups to lock the same, all substantially as shown and described and particularly pointed out in the claim.

In the accompanying drawings, Figure 1 is a perspective view of a harrow embodying my invention. Fig. 2 is an enlarged plan view of a section of one of the harrow beams or bars and a cross section of a harrow tooth and a clip or stirrup securing the tooth in place on line 2—2 Fig. 3. Fig. 3 is an enlarged elevation of a portion of a harrow tooth and a cross section of the beam and clip by which it is supported.

As thus shown the invention consists in a harrow having a frame made up with metallic channel bars or beams B of substantially or approximately U shape in cross section and arranged to have the teeth D clamped against the two edges thereof, so that there shall be two bearing edges for the teeth at different elevations and against which the teeth are locked by the clips or stirrups C, as shown. Several details of construction enter into these parts to make the adjustment and engagement of the teeth effective, such as the preferably angular notches 2 in the respective edges or flanges or sides 3 of the bars B adapted to receive and seat the angles or corners of teeth D, the said teeth being preferably square in cross section, as shown, though they might have different cross sectional shape and come within the scope of my invention, such, for example as a diamond shape.

The teeth D are provided with one or more notches 4 in their angles or corners, and if more than one notch be used in the same edge such notches are spaced apart to make the desired adjustment as the teeth become worn or to set them deeper in the soil, and the teeth may be made interchangeable as to the sides of the harrow by providing two series of notches in opposite corners or angles as shown herein. The said teeth might also have straight points if desired but they are shown as having forwardly inclined and somewhat flattened points after the manner of cultivator teeth, and to make such teeth interchangeable as to sides a series of notches for each side of the harrow is required. In such case, as also herein shown, said notches are arranged directly opposite each other transversely in the two series. In this instance, I show the said notches in such number and relation to each other as to space apart that when clip or stirrups C engage in a given notch the notches at the opposite edge come above or below the edges 3 in bar B, so that said locking clip C engages in an outer notch midway between the bar edges 3 and effectually clamps the tooth to the beam and at the same time locks the tooth against possible endwise movement. The said clip or stirrup has threaded ends carrying nuts 5 which fasten it against the rounded side and center of bar B. All the teeth are secured in like manner and all are adjustable as to depth as compared with beam B, so that as they wear away, they can be sharpened or repaired and be lowered until practically worn out. But when fastened in the harrow as shown and described the teeth are locked against possible movement either vertically or rotarily by both beam and clip. Obviously, they cannot move vertically because of the notch engaged by clip or stirrup C, and they cannot rotate or turn in their bearings because they are locked in notches 2 in the beam, which renders rotation impossible.

Heretofore there has been much trouble in harrows as usually constructed in the losing of teeth by their working loose and dropping out unnoticed by the driver, thus both entailing loss of tooth and imperfect work, but by my construction no loss of tooth can occur even if it should get loose in its bearings, because the notches 4 are deep enough to keep it in place by means of the clip C and hold it notwithstanding. Ordinarily, such looseness will disclose itself and the tooth can be tightened before it gets away.

What I claim is:—

In a harrow, a metallic beam having two edges one above the other spaced apart and provided with coincident V shaped notches, in combination with a tooth angular in cross section seated in said notches and having a series of notches in its opposite angle, and a stirrup engaged in one of the outer notches in said teeth and locking the opposite edge thereof to said beam.

In testimony whereof I sign this specification in the presence of two witnesses.

ELIAS HAIMAN.

Witnesses:
E. M. FISHER,
F. C. MUSSUN.